Patented Mar. 20, 1951

2,545,554

UNITED STATES PATENT OFFICE 2,545,554

PRODUCTION OF STREPTOMYCIN-RESISTANT STRAINS OF STREPTOMYCES GRISEUS

Lloyd Everett McDaniel, Rahway, N. J., and Arabelle B. Hodges, Washington, D. C., assignors to Merck & Co., Inc., Rahway, N. J., a corporation of New Jersey No Drawing. Application February 14, 1948, Serial No. 8,306

2 Claims. (Cl. 195—79)

This invention relates to new procedures for obtaining enhanced yields of streptomycin by submerged aerated fermentation of nutrient mediums. More particularly the invention relates to production of streptomycin by submerged aerated fermentation of nutrient mediums using as the fermenting agent strains of *Streptomyces griseus*, the initial and continued growth of which is not inhibited by concentrations of streptomycin as high as 500 mcg./ml., and to the process for developing such streptomycin resistant strains of *S. griseus*.

It has been reported by Schatz and Waksman in "Proceedings of the National Academy of Sciences" 31, 129–37 and by Waksman, Reilly and Johnstone in Journal of Bacteriology 52, 393–7, that, although non-streptomycin-producing strains of *S. griseus* are sensitive to quantities of streptomycin in a culture medium, the streptomycin-producing strains are resistant to and grow well in media containing considerable amounts of streptomycin.

We have discovered, however, that streptomycin-producing strains of *S. griseus* are in reality sensitive to high initial concentrations of streptomycin in the medium. This is illustrated in the following tabulations of growth of a good streptomycin-producing strain of *S. griseus* using spore inoculums in a culture medium containing varying initial amounts of streptomycin.

TABLE I

*Shake-culture technique (submerged growth)*

| Streptomycin in initial medium, mcg./ml. | Growth [1] Age of culture in days | | | | |
|---|---|---|---|---|---|
| | 2 | 3 | 4 | 5 | 6 |
| 0 | 4 | 4 | 4 | 2 | 2 |
| 100 | 4 | 4 | 4 | 2 | 2 |
| 150 | 4 | 4 | 4 | 2 | 2 |
| 200 | 2 | 4 | 4 | 2 | 2 |
| 250 | 1 | 2 | 3 | 2 | 2 |
| 300 | ½ | 1½ | 2 | 2 | 2 |

[1] Growth recorded on the basis of visual observation ranging from 4 for heavy growth, downward.

TABLE II

*Surface culture on agar medium*

| Streptomycin in initial medium, mcg./ml. | Growth [1] | |
|---|---|---|
| | 2 days | 4 days |
| 0 | 4+ | 4+ |
| 100 | 2+ | 3+ |
| 150 | 1+ | 3+ |
| 200 | 1+ | 2+ |
| 250 | ½+ | 1+ |
| 300 | trace | trace |
| 400 | trace | trace |
| 500 | trace | trace |

[1] Growth recorded on the basis of visual observation ranging from 4+ for heavy growth, downward.

These results show that concentrations of streptomycin above 150 to 200 mcg./ml. in the curture medium markedly retard the growth of the organism in both submerged and surface culture when growth is initiated from a spore inoculum, and that concentrations in excess of 300 mcg./ml. inhibit almost completely the growth of the organism. This unusual effect of streptomycin on the growth of streptomycin-producing strains of *S. griseus* was not noticed previously by Schatz and Waksman or by Waksman, Reilly and Johnstone, probably because they did not use any streptomycin concentrations in excess of 100–125 mcg./ml. in the starting medium.

We have discovered that resistance to high concentrations of streptomycin is a property which can be created or built up in the organism by controlled propagation of the organism in mediums containing increasing initial amounts of streptomycin. It is preferable in carrying out this procedure to start with a medium containing a concentration of streptomycin which has previously been determined to markedly inhibit the growth of the particular strain of *S. griseus*. Under these conditions, while the growth will be retarded, there will be considerable growth and development over an incubation period of several days. The organism can thus be propagated in the presence of streptomycin either by surface culture or nutrient agar or by submerged aerated fermentation in an aqueous nutrient medium.

The resultant mycelium growth accumulated after several days of incubation, or a portion of the culture, is then transferred to a new medium containing a somewhat higher initial concentration of streptomycin. This new medium can also be either a nutrient agar or an aqueous medium and need not necessarily contain the same nutrients as the medium previously employed.

The streptomycin concentration in the new medium is preferably of the order of 100 mcg./ml. higher than the starting streptomycin concentration in the previous propagation. Growth of the organism in the presence of this higher concentration is markedly inhibited but over a period of several days of incubation there is appreciable growth and development of the culture. When maximum growth in the medium of higher streptomycin content is achieved, a portion of the culture is again transferred to a new medium containing a still higher initial streptomycin content and incubated as before.

By thus repeatedly propagating the organism in mediums containing increasing amounts of streptomycin, it is possible to obtain resistant strains of S. griseus which will grow well in mediums containing initial streptomycin concentrations of 500 to 600 mcg./ml. and even higher. A strain once developed to a point of resistance to a particular streptomycin concentration when thereafter propagated in mediums containing streptomycin concentrations of the same order exhibit normal growth and sporulation, thus indicating that there has been a distinct physiological change in the organism.

The foregoing procedure has been employed with several strains of S. griseus and, apparently, can be employed with any streptomycin-producing strains of S. griseus to develop the resistance of the strain to the point where it will grow readily in mediums containing initial streptomycin concentrations of 500 mcg./ml. or more. A typical development of a low resistant strain to a high resistant strain is illustrated in the following example:

EXAMPLE I

Spores from a standard strain of S. griseus (Waksman No. 4) were developed on nutrient agar and, upon testing, found to be inhibited in growth by a concentration of 200–250 mcg./ml. of streptomycin. Spores removed from the agar culture were then used to inoculate an aqueous medium containing as nutrients

| | Per cent |
|---|---|
| Pepticase | 1 |
| NaCl | 1 |
| Dextrose | 0.9 |
| $K_2HPO_4$ | 0.1 |
| $MgSO_4.7H_2O$ | 0.1 |
| $FeSO_4.7H_2O$ | 0.002 |
| $ZnSO_4.7H_2O$ | 0.0002 |
| $CaCl_2$ | 0.01 |
| Tap Water | to 100 | and also containing 250 mcg./ml. of streptomycin and the inoculated medium was incubated under aerated submerged conditions for a period of 4 days at a temperature of 27° C. At the end of this time, a 10% portion of the culture containing the mycelium was used to inoculate a new medium having the same nutrient composition but containing 500 mcg./ml. of streptomycin. Incubation of this inoculated medium showed very slow growth, indicating that the streptomycin content had been increased by too large an increment. There was, however, appreciable growth of the organism and after incubation for 2 days, a 10% portion of the culture containing the mycelium was used to inoculate a new medium having the same basic composition but containing 400 mcg./ml. of streptomycin. After incubation for 4 days a portion of the culture was employed to inoculate a new medium containing 500 mcg./ml. of streptomycin. After 4 days of incubation a portion of the culture was again used to inoculate nutrient agar containing 600 mcg./ml. of streptomycin. The mycelium was then developed on the agar by incubation at 27° C. to develop the quantity of the streptomycin resistant strain.

The starting culture of this series of incubations, i. e., the Waksman #4 strain, was rated as yielding only 2+ growth of organism in 2 days on a nutrient medium containing 200 mcg./ml. of streptomycin while at 300 mcg./ml. only a trace of growth was apparent. As a result of the treatment, the final resistant strain or culture yielded 3+ growth in only 24 hours in a medium containing 500 mcg./ml. of streptomycin. When propagated on nutrient agar containing 600 mcg./ml. of streptomycin, the resistant culture produced normal growth and sporulation. In contrast to this, the parent culture, i. e., Waksman #4, showed only a trace of growth and no sporulation on nutrient agar containing a streptomycin concentration of 250 mcg./ml.

We have also found that strains of S. griseus, which have been developed to a point of high resistance to streptomycin, produce appreciably higher yields of streptomycin when grown in a nutrient medium under submerged aerated conditions than the yields obtainable from the parent strain under the same conditions. The increase found in the yield of streptomycin was generally of the order of 10 to 25% although increases as high as 50% were not uncommon. Typical illustration of the production of enhanced yields of streptomycin by streptomycin resistant strains of S. griseus in different nutrient mediums, and of the higher yields obtained as compared with the yields from the parent strain of S. griseus are shown in the following examples.

EXAMPLE II

Two mediums were prepared having the following compositions:

Medium A.—1% dextrose, 1% N-Z-Amine type A (a pancreatic digest of casein supplied by Sheffield Farms Co.), 1% NaCl, 0.6% beef extract, water to 100%, pH 6.3–6.5

Medium B.—Same as medium A but with 0.3% $K_2HPO_4$ added.

Two flasks of each medium were inoculated with the parent strain of S. griseus employed in Example I, and two flasks of each medium were inoculated with the final strain of S. griseus (resistant to 600 mcg./ml. of streptomycin) obtained in Example I. The flasks were inoculated at 28° C. for 72 hours under submerged aerated conditions. Then new flasks containing the same mediums were inoculated with vegetative growth from the initial flasks, and were incubated under the same conditions. At intervals of 24, 48, 72, and 96 hours samples were taken from the various flasks for assay as to streptomycin content. The comparative yields at the different time intervals are tabulated below.

| Culture | Medium | mcg./ml. of streptomycin | | | |
|---|---|---|---|---|---|
| | | 24 hrs. | 48 hrs. | 72 hrs. | 96 hrs. |
| Parent | A | 96 | 192 | 148 | 163 |
| | | 55 | 214 | 124 | 160 |
| | B | 48 | 153 | 119 | 139 |
| | | 60 | 188 | 140 | 150 |
| Resistant | A | 92 | 221 | 217 | 232 |
| | | 87 | 188 | 205 | 239 |
| | B | 110 | 158 | 242 | 264 |
| | | 83 | 181 | 263 | 240 |

EXAMPLE III

A yeast broth medium of pH 6.5 was prepared having the following composition:

1.0% NaCl
1.0% dextrose
0.5% $NaNO_3$
0.1% $MgSO_4$
0.1% $K_2HPO_4$
0.01% $CaCl_2$
10 mg./liter $FeSO_4.7H_2O$
2 mg./liter $ZnSO_4.7H_2O$
tap water to 100% volume
2.5% Pfeiffer's dried yeast Everything except the $K_2HPO_4$ and $CaCl_2$ was dissolved together in water. The $K_2HPO_4$ and $CaCl_2$ were separately dissolved and added later. The solution was then subdivided and 2.5% dried yeast added.

A total of 240 flasks were set up, each containing 40 cc. of the yeast broth, sterilized at 120° C. and 15 lbs. pressure and divided into five groups of 48 flasks each. The 48 flasks of one group were inoculated with a suspension of spores of the Waksman # 4 strain of *S. griseus*. The flasks of the other four groups were inoculated with spores of four different strains of *S. griseus* obtained by the procedure described in Example I and having the property of resistance to 600 mcg./ml. of streptomycin.

The inoculated flasks were incubated at 28° C. under submerged, aerated conditions, aeration being provided by a rotary shaker operating at 210 revolutions per minute. After 3 and 4 days of incubation samples were taken from all flasks, pooled in duplicate, and assayed for streptomycin content (24 assays for each inoculum). The average yield of streptomycin, as well as the highest and lowest yields shown by the individual assays, for the five different strains are tabulated below.

| Strain | Streptomycin in mcg./ml. | | | | | |
|---|---|---|---|---|---|---|
| | 3 days | | | 4 days | | |
| | Av. of 24 | Lowest | Highest | Av. of 24 | Lowest | Highest |
| Parent | 226 | 132 | 300 | 260 | 171 | 348 |
| Resistant A | 312 | 248 | 430 | 290 | 204 | 380 |
| Resistant B | 324 | 178 | 386 | 326 | 200 | 412 |
| Resistant C | 299 | 224 | 360 | 317 | 258 | 380 |
| Resistant D | 299 | 240 | 360 | 292 | 232 | 380 |

The above tabulation clearly shows the enhanced yields obtained with the resistant strains. The most striking advantage appears after three days of incubation where it will be noted that the lowest yield of two of the resistant strains is appreciably higher than the average yield of the parent strain, and the average yield of all of the resistant strains is as good as or better than the highest yield of the parent strain. A comparison of the yields after 3 and 4 days incubation indicates that high yields are reached in shorter time with the resistant strain than with the parent strain. This is of primary importance since it is evident that reduction of the optimum incubation period from 4 days to 3 days means an increase of about 33⅓% in the potential capacity of available fermentation equipment. This advantage, coupled with the higher streptomycin yields consistently obtained in various mediums when using the new streptomycin resistant strains of *S. griseus*, clearly demonstrates the commercial significance of our improved process for preparing streptomycin by fermenting a nutrient medium under submerged aerated conditions by means of a strain of *S. griseus* characterized as being resistant to, i. e., growing normally in, initial concentrations of streptomycin of at least 500 mcg./ml.

While the foregoing description and examples are illustrative of preferred embodiments of our invention, it will be noted that various changes and modifications can be made without departing from the spirit and scope of the invention and we are to be limited only by the appended claims.

We claim:

1. The process that comprises propagating a streptomycin-producing strain of *S. griseus* in a nutrient medium containing an initial streptomycin concentration of about 250 mcg./ml. employing the mycelium formed during such propagation to inoculate a nutrient medium containing an initial streptomycin concentration approximately 100 mcg./ml. higher than said first named medium, and repeating the propagation and inoculation of successive mediums having initial streptomycin concentrations increasing in increments of about 100 mcg./ml. until a resistant strain of *S. griseus* is obtained which grows well in mediums containing an initial streptomycin concentration of at least 500 mcg./ml.

2. The process for preparing streptomycin in enhanced yield that comprises fermenting an aqueous nutrient medium, under submerged aerated conditions, for about 3 days at a temperature of about 28° C., with a resistant strain of *S. griseus* developed by the process defined in claim 1.

LLOYD EVERETT McDANIEL.
ARABELLE B. HODGES.

REFERENCES CITED

The following references are of record in the file of this patent:

UNITED STATES PATENTS

| Number | Name | Date |
|---|---|---|
| 620,022 | Effront | Feb. 21, 1899 |
| 1,148,938 | Takamine | Aug. 3, 1915 |
| 2,085,428 | Hanson | June 29, 1937 |

OTHER REFERENCES

Waksman, Jour. Am. Pharm. Ass'n., Nov. 1945, pp. 273–276.

Schatz et al., Proc. Nat'l. Acad. Sci., 31 (1945), pp. 129 to 137.

Waksman, Reilly and Johnstone, Jour. Bact. 52, Oct. 1946, p. 394.

Waksman, Reilly and Harris, Proc. Soc. Exptl. Biol. and Med., 66, #3, Dec. 1947, pp. 617 to 619.